US006615859B2

(12) United States Patent
Sato et al.

(10) Patent No.: US 6,615,859 B2
(45) Date of Patent: Sep. 9, 2003

(54) FLUID SUPPLY INTERRUPTION FREE METHOD OF CONSTRUCTION (75) Inventors: Toshiyuki Sato, Gamo-Gun (JP); Tamotsu Yamashita, Gamo-Gun (JP)

(73) Assignee: Suiken Co., Ltd., Shiga (JP)

(*) Notice: Subject to any disclaimer, the term of this patent is extended or adjusted under 35 U.S.C. 154(b) by 0 days.

(21) Appl. No.: 09/874,531

(22) Filed: Jun. 5, 2001

(65) Prior Publication Data
US 2002/0007851 A1 Jan. 24, 2002

(30) Foreign Application Priority Data
Jul. 21, 2000 (JP) ........................................ 2000-220183

(51) Int. Cl.[7] .............................................. F16K 43/00
(52) U.S. Cl. ..................... 137/15.14; 30/94; 405/154.1; 405/156; 408/1 R; 409/132; 409/183; 137/318
(58) Field of Search .......................... 137/15.14, 15.15, 137/315.41, 318; 30/94; 82/78, 113; 83/745; 408/1 R, 87, 88; 409/132, 185, 190, 183; 405/154.1, 156

(56) References Cited

U.S. PATENT DOCUMENTS

| 1,007,882 | A | * | 11/1911 | Markley | 137/318 |
| 1,701,691 | A | * | 2/1929 | Mueller et al. | 137/318 |
| 1,989,768 | A | * | 2/1935 | Nieman | 137/318 |
| 2,151,594 | A | * | 3/1939 | Grantham | 137/318 |
| 2,188,607 | A | * | 1/1940 | Larry et al. | 137/318 |
| 2,756,486 | A | * | 7/1956 | Smith | 137/318 |
| 3,385,314 | A | * | 5/1968 | Thompson | 137/318 |
| 3,533,424 | A | * | 10/1970 | Wedge | 137/318 |
| 3,626,576 | A | * | 12/1971 | Ray | 137/318 |
| 3,773,067 | A | * | 11/1973 | Ray | 137/318 |
| RE27,895 | E | * | 1/1974 | Ray | 137/318 |
| 3,948,282 | A | * | 4/1976 | Yano | 137/318 |
| 3,991,791 | A | * | 11/1976 | Luckenbill | 138/94 |
| 3,995,655 | A | * | 12/1976 | Sands | 137/318 |
| 4,127,141 | A | * | 11/1978 | Ledonne et al. | 137/318 |
| 4,431,017 | A | * | 2/1984 | Willemsen | 137/318 |
| 4,516,598 | A | * | 5/1985 | Stupak | 137/318 |
| 4,527,586 | A | * | 7/1985 | Yano et al. | 137/318 |
| 4,648,422 | A | * | 3/1987 | Amblard | 137/318 |
| 4,719,936 | A | * | 1/1988 | Tsubakimoto et al. | 137/318 |
| 5,063,957 | A | | 11/1991 | Yano et al. | 137/318 |
| 5,074,526 | A | * | 12/1991 | Ragsdale et al. | 137/318 |
| 5,129,681 | A | * | 7/1992 | Yano et al. | 285/23 |
| 5,611,365 | A | * | 3/1997 | Maichel | 137/318 |
| 5,732,728 | A | * | 3/1998 | Maichel | 137/318 |
| 6,308,726 | B2 | * | 10/2001 | Sato et al. | 137/15.14 |
| 6,470,907 | B1 | * | 10/2002 | Sato et al. | 137/15.14 |

FOREIGN PATENT DOCUMENTS

JP          4296293          10/1992

* cited by examiner

Primary Examiner—George L. Walton
(74) Attorney, Agent, or Firm—Jordan and Hamburg LLP (57) ABSTRACT An existing straight pipe 1 is cut off at two locations by rotating two seal-up housings 2 each mounted with a cutter 3, to form two cutoff groove 12C. A straight pipe portion 1p between the two cutoff grooves 12C remains left without retrieval, to impart a flexibility and contraction and expansion properties to a pipeline.

5 Claims, 8 Drawing Sheets

FLUID SUPPLY INTERRUPTION FREE METHOD OF CONSTRUCTION

BACKGROUND OF THE INVENTION

1. Field of the Invention

The present invention relates to a fluid supply interruption free method of construction in which a construction work is carried out while allowing a fluid to flow through an existing pipeline.

2. Description of the Related Art

Up until now, buried water pipes, gas pipes, etc., have often experienced a compulsory deformation of a pipeline as a result of occurrence of earthquake or uneven settlement of the ground. The buried pipes are subjected to a tensile force and a compressive force in the pipe axial direction or to a bending force applied in the direction orthogonal to the axis of the pipe. For this reason, development has hitherto been made of various joints having a flexibility or of flexible contraction and expansion pipes.

A simple method of construction has not yet been developed that ensures an impartment of flexibility and contraction and expansion properties to the existing pipeline without fluid supply interruption.

SUMMARY OF THE INVENTION

It is therefore the object of the present invention to provide a simple fluid supply interruption free method of construction capable of imparting a flexibility and contraction and expansion properties to the existing pipeline while allowing a fluid to flow through the existing pipeline.

According to a first aspect of the present invention, to attain the above object there is provided a fluid supply interruption free method of construction in which a pit is formed in the earth so as to allow an exposure of an existing straight pipe to perform a construction work with a fluid flowing through the straight pipe, the method comprising the steps of providing a cutter having a cutting tool, and providing two sets of seal-up housings each comprising a plurality of circumferentially segmented housing parts.

The two sets of seal-up housings each hermetically enclose a part of the existing straight pipe and have a structure suited for rotations around the straight pipe in the circumferential direction of the straight pipe. Each seal-up housing has a cutting tool insertion aperture adapted for insertion of the cutting tool into the straight pipe in the radial direction of the straight pipe. The cutting tool insertion aperture has a smaller diameter than the pipe inner diameter of the straight pipe.

The method of the present invention comprises an assembly step, an infeed step, a feed step and a tool removal step.

The assembly step includes mounting said seal-up housing on the existing straight pipe to enclose a part of the straight pipe by the seal-up housing, and mounting the cutter on the cutting tool insertion aperture of each seal-up housing.

The infeed step includes causing the cutting tool to cut into the straight pipe in the radial direction of the straight pipe while turning the cutting tool to make a cutting motion for cutting the straight pipe by turns of the cutting tool.

The feed step includes rotating the seal-up housing in the circumferential direction of the straight pipe while continuing the cutting motion, the rotations causing the cutting tool to rotate in the circumferential direction of the straight pipe to make a feed motion of the cutting tool, to thereby form a cutoff groove in the straight pipe over the entire perimeter of the straight pipe.

The tool removal step includes removing the cutting tool from the seal-up housing after the formation of the cutoff groove.

The assembly step, the infeed step, the feed step and the tool removal step are executed for each of the two sets of seal-up housings.

The two sets of seal-up housings are mounted on the existing straight pipe at two axially spaced-apart locations within a single pit in the assembly step.

In the method of the present invention, the above steps are executed for each of the two sets of seal-up housings, to thereby form two axially spaced-apart cutoff grooves in the straight pipe, thus leaving a straight pipe portion between the two cutoff grooves without extraction from an existing pipe line to thereby impart a flexibility and contraction and expansion properties to the pipeline.

When a tensile force or a compressive force is applied to the pipeline finished by the present method of construction, the existing straight pipe is permitted to be displaced in the pipe axial direction of the seal-up housings. When a bending force is applied to the pipeline in the direction orthogonal to the pipe axis, the existing straight pipe is permitted to be bent relative to the seal-up housings.

In this manner, according to the present invention, contraction and expansion properties and flexibility are imparted to the pipeline.

In the present method of construction, the seal-up housings are rotated to cut off the existing straight pipe at two locations such that the straight pipe portion remains left between the two cutoff grooves without removal thereof, whereby it is possible to simply perform a construction work as compared with the case where the bite is turned for cutoff in a work tank.

The cutting tool for use in the method of construction of the present invention is preferably a milling-like (whole shape is substantially cylindrical) cutting tool having cutting edges on its tip face and outer peripheral surfaces of the tool. As used herein, the "milling-like cutting tool" means a tool capable of cutting into the straight pipe and of feeding the cutting tool in the circumferential direction of the straight pipe to thereby form a groove in the straight pipe. Use of the milling-like tool enables the cutting tool insertion aperture to be diminished to achieve a reduction in size of the seal-up housings. Thus, the completed piping structure becomes compact.

The milling-like cutting tool presents a larger cutoff groove width than a milling cutter or other cutting tool. Thus, a larger tolerance is ensured for the compressive deformation of the pipeline.

The existing steel pipe jointed by welding has no flexible joint, so that application to such a steel line (pipeline) renders the present method of construction effective.

In case of cutting an existing straight pipe having a mortar lining on the inner surface of the pipe by the present method of construction, it is preferable to use a cutting tool provided with a multiplicity of chips made of a hard metal or a cutting tool having cutting edges in the form of diamond particles.

In case of cutting the steel pipe, it is preferred to use a cutting tool having cutting edges made of a high speed steel.

In the present invention, "seal-up" does not mean a complete seal-up but means that a watertightness is kept to such a degree as to allow a construction work without interruption of the fluid supply. Accordingly, the "seal-up housing" refers to a housing having a pressure resistance capable of withstanding the pressure of a fluid flowing through the interior of the existing straight pipe and having water stop properties to a certain extent. The "seal-up housing" may be separated into a plurality of housing parts in the pipe axial direction (e.g., see Japan Patent Laid-open Pub. Nos. Hei11-287385 and Hei11-304073), in such an instance, the entirety of the seal-up housing need not necessarily be rotated but instead a part of the seal-up housing may undergo rotations. Although in the preassembled state of the "seal-up housing" to the existing straight pipe, the "seal-up housing" is made up of a plurality of circumferentially separated housing parts, the housing parts may be integrated by welding into a circumferentially endless body after the assembly.

"Hermetically enclosing" means that the seal-up is made to such a degree as not to impede the cutting or other works. For example, the seal-up housing may be provided with a drainage hole so that the drainage hole is opened during the cutting work to drain cutting chips together with water through the drainage hole.

In the present invention, "cutting" means partly removing the pipe wall by turning the cutting edges. The "cutting motion" refers to turning of the cutting edges, whereas the "feed motion" refers to a displacement of the cutting tool to positions where the cutting tool can sequentially cut out a fresh portion of the pipe wall.

In the present invention, the two seal-up housings may be attached to a single or two straight pipes to make sequential or simultaneous cutoff operations. In the present invention, a single seal-up housing may be attached to the existing straight pipe and mounted with the cutter to make a first cutoff, after which another seal-up housing may be attached to the straight pipe and mounted with the cutter to make a second cutoff. In the present invention, the infeed step and the feed step may simultaneously be carried out as long as the cutoff of the existing straight pipe is achieved.

Furthermore, in the present invention, the seal-up housing may previously be mounted with the cutter after which the seal-up housing may be attached to the straight pipe.

In the present invention, the cutting tool insertion aperture is typically blocked by a plug or a plate flange, but instead the operation valve may intactly be left or the insertion aperture may be fitted with an air valve, etc.

DESCRIPTION OF THE PREFERRED EMBODIMENTS

The present invention will clearly be understood from the following description of preferred embodiments with reference to the accompanying drawings. It is to be noted however that the embodiments and drawings are merely for illustrative and descriptive purposes. The scope of the present invention is defined by the appended claims. In the drawings annexed, like reference numerals designate like or corresponding parts throughout several views.

The embodiments of the present invention will now be described in light of the accompanying drawings.

FIGS. 1 to 7 depict a first embodiment.

Seal-up Housing 2

Figure 1A:
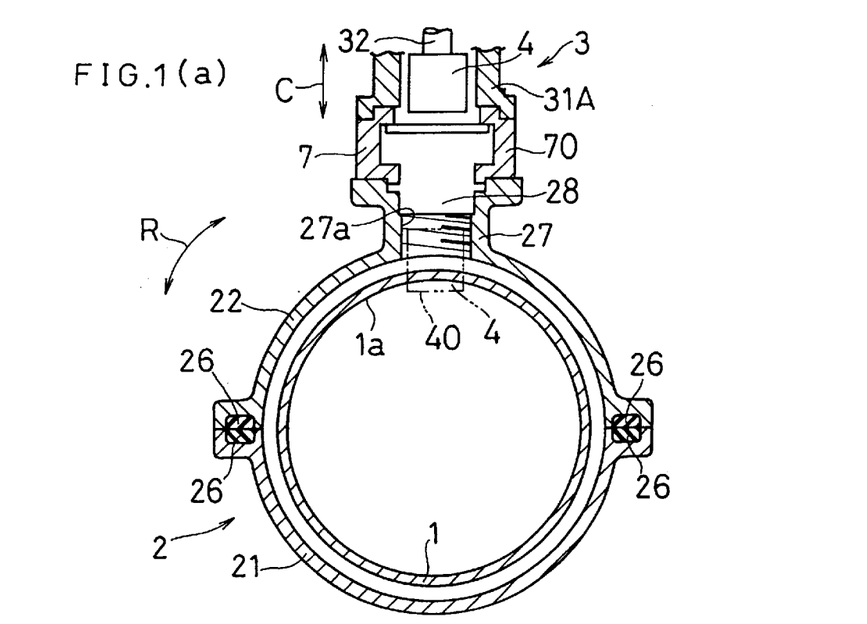
FIG. 1(a) is a transverse sectional view showing an assembly step of a method of construction in accordance with a first embodiment of the present invention.
Figure 1B:
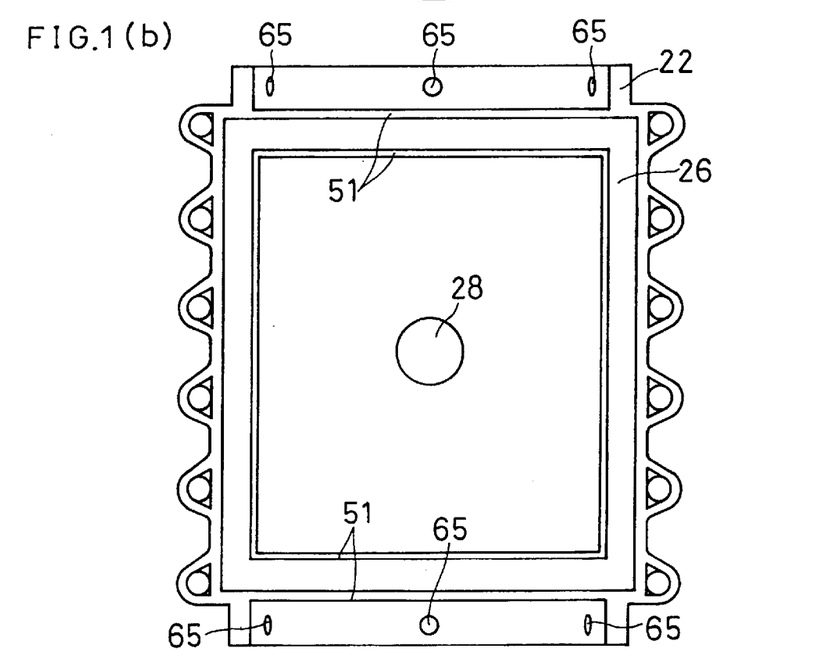
FIG. 1(b) is a top plan view of a second housing part viewed from the inside.
Figures 2A, 2B:
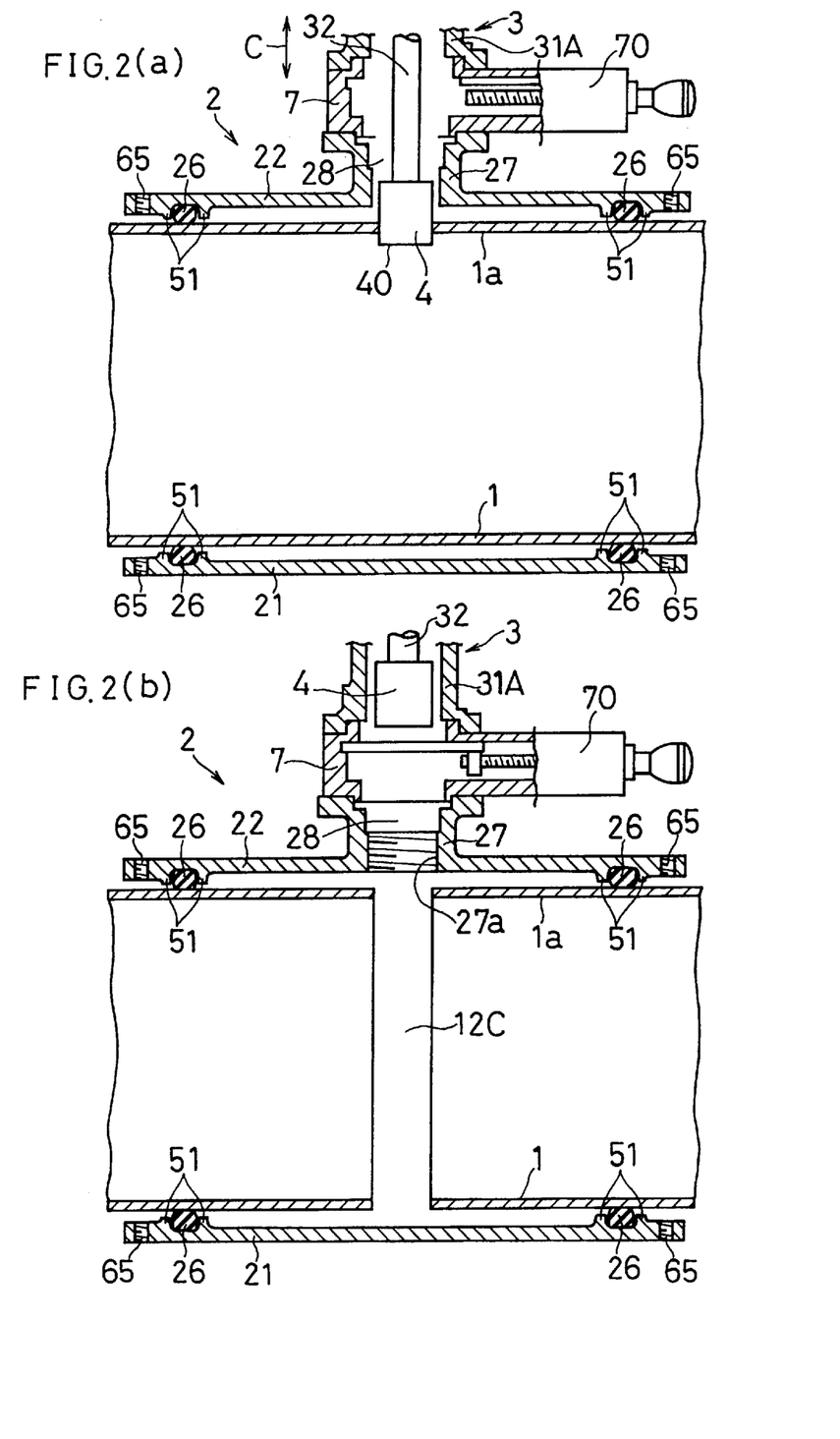
FIG. 2(a) is a longitudinal sectional view showing an infeed step.
FIG. 2(b) is a longitudinal sectional view showing a tool removal step.

As shown in FIGS. 1(a) and 2(a), a seal-up housing 2 comprises first and second housing parts 21 and 22 which are halved in a circumferential direction R of an existing straight pipe 1 (hereinafter referred to simply as "existing pipe 1"). The seal-up housing 2 is rotatable in the circumferential direction R. A rubber packing 26 is disposed to provide a hermetic seal between the sealup housing 2 and the existing pipe 1 as seen FIGS. 2(a) and 2(b) and between the first housing part 21 and the second housing part 22 as seen in FIG. 1(a). The first housing part 21 is a housing part covering the existing pipe 1 from below whilst the second housing part 22 is a housing part covering the existing pipe 1 from above. As shown in FIG. 2(a), the seal-up housing 2 has at its both ends a pair of integrally formed first ridges 51, 51 in which the rubber packing 26 is fitted. The pair of first ridges 51, 51 protrude inward in the pipe radial direction C on the inner surface of the seal-up housing 2 to thereby allow a proximity to the outer peripheral surface of the existing pipe 1 and hold the rubber packing 26 in position. It is therefore preferred to form the first ridges 51, 51 over the entire perimeter in the circumferential direction of the seal-up housing 2.

The second housing part 22 has a branching portion 27 integrally formed therewith. The branching portion 27 is formed substantially centrally in the axial direction of the existing pipe 1 and projects upward in the radial direction C of the existing pipe 1 in a branched manner. The branching portion 27 is formed with a cutting tool insertion aperture 28. The cutting tool insertion aperture 28 is adapted for insertion of a cutting tool 4 which will be described later in the radial direction C of the existing pipe 1 and has a smaller internal diameter than the pipe internal diameter of the existing pipe 1. The branching portion 27 has in its inner side (inner peripheral surface) an internally threaded portion 27a into which is screwed a plug 60 having an external thread of FIG. 5(b). The branching portion 27 has at its extremity a valve casing 7 for an operation valve 70, the valve casing 7 being removably mounted on the seal-up housing 2. A cutter case 31A of a cutter 3 is fixedly secured via the operation valve 70 to the branching portion 27. The operation valve 70 serves to allow taking out the cutting tool 4 and allow an insertion of the plug 60 with a fluid flowing through the existing pipe 1. A rubber seal not shown is disposed to provide a hermetic sealing between the branching portion 27 and the operation valve 70 and between the operation valve 70 and the cutter case 31A.

The seal-up housing 2 is provided with no aperture for the valve passage adapted for the gate valve insertion into the existing pipe 1 (e.g., see Japan Patent Laid-open Pub. Nos. 2000-88173 and Hei1-287385).

Cutter 3

An example of the cutter 3 will then be described with reference to FIG. 3.

Figure 3:
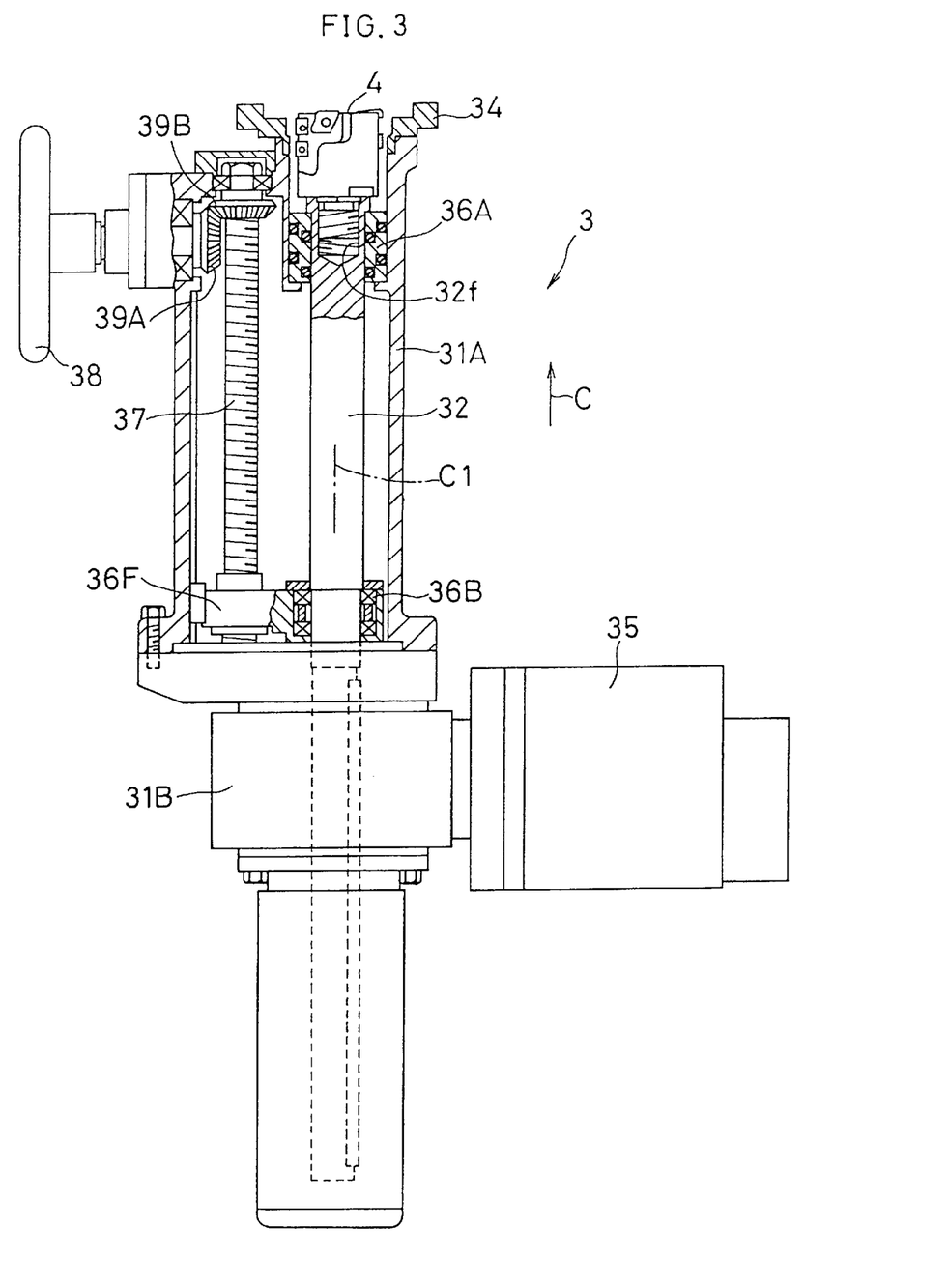
FIG. 3 is a partly cut-away side elevational view showing a cutter.

A cutter case 31A of the cutter 3 shown in FIG. 3 is firmly secured to the operation valve 70 (FIG. 1) via an attachment 34. An elongated cutter shaft 32 is inserted through the cutter case 3 1A and through a gear case 31B. Within the cutter case 31A and the gear case 31B the cutter shaft 32 is rotatably supported around an axis C1 via a first bearing 36A and another bearing not shown, respectively. The axis C1 of the cutter shaft 32 is positioned so as to coincide with the radial direction C of the existing pipe 1 when the cutter 3 is mounted on the seal-up housing 2. The cutter shaft 32 is turned via reduction gears or bevel gears not shown by a power from an electric motor (an example of the motor).

The interior of the cutter case 31A is provided with an infeed screw 37 that extends in parallel with the cutter shaft 32. The infeed screw 37 is forwardly or reversely rotated via bevel gears 39A and 39b by turning a handle 38. The infeed screw 37 is threadedly engaged with an internal thread formed on a hold portion 36F. The hold portion 36F provides a hold of the cutter shaft 32 by way of a second bearing 36B. Thus, turns of the handle 38 bring about rotations of the infeed screw 37 causing a forward or rearward displacement of the hold portion 36F, with the result that the cutter shaft 32 advances or retreats.

The extremity of the cutter shaft 32 is formed with an internal thread 32f for securing the cutting tool 4.

Figure 4:
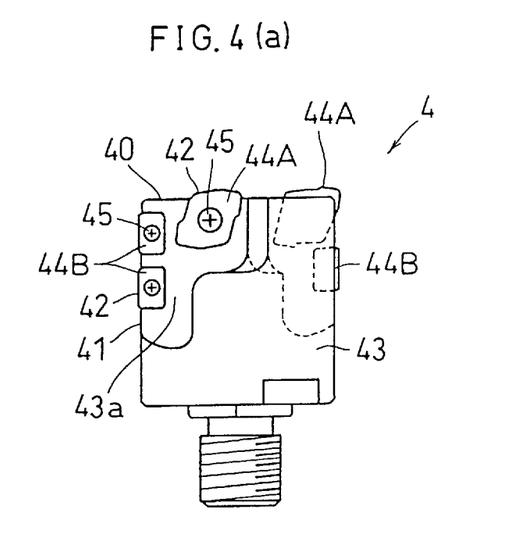
FIG. 4(a) is a side elevational view of a cutting tool.
FIGS. 4(b) and 4(c) are perspective views each showing the cutting tool.

Description will then be made of an example of a preferred milling-like cutting tool 4 with reference to FIGS. 4(*a*), 4(*b*) and 4(*c*).

The cutting tool 4 has a tool body 43 which is fixedly screwed into the internal thread 32f (FIG. 3). First and second chips 44A and 44B are firmly secured via male screws 45 to the tool body 43 such that the chips 44A and 44B can be replaced with new ones upon the abrasion of cutting edges 42.

The first chips 44A form the cutting edges 42 at a tip face 40 of substantially the cylindrical tool body 43 and cut into the existing pipe 1. On the other hand, the second chips 44B form the cutting edges 42 at an outer peripheral surface 41 of substantially the cylindrical tool body 43 to cut the existing pipe 1. The tool body 43 has a large notch 43*a* positioned in front of the chips 44A and 44B to let out cutting chips.

The milling-like cutting tool can be a tool having cutting edges on three or more portions of its circumferential surfaces or a tool having a center drill attached centrally to the tip of the tool body 43.

Steps of a cutoff method of the existing pipe 1 will then be described.

Assembly Step

First, the operator mounts the seal-up housing 2 on the existing pipe 1 with a liquid (water) flowing through the interior of the existing pipe 1 of FIG. 1(*a*). After this mounting, the operator puts the housing parts 21 and 22 together by means of assembling bolts not shown.

Afterward, the operator mounts the operation valve 70 and the cuter 3 to the seal-up housing 2. Thus, the seal-up housing 2 hermetically encloses a part of the existing pipe 1.

Infeed Step

After the assembling step, the operator operates the cutter 3 to lower the cutting tool 4 to a position where the tip face 40 of the cutting tool 4 is in close proximity to the top surface of the existing pipe 1. Afterward, the operator puts the motor not shown into action so that the cutting tool 4 turns together with the cutter shaft 32 to start its cutting motion for cutting the existing pipe 1. During the execution of the cutting motion, the operator acts on the cutter 3 to lower the cutting tool 4 in the radial direction C so that as indicated by a dashed double-dotted line of FIG. 1(*a*) and as shown in FIG. 2(*a*), the tip face 40 of the cutting tool 4 passes through a part of a pipe wall 1*a* of the existing pipe 1 toward the center in the radial direction C. The infeed by the cutting tool 4 is thus completed.

Feed Step

With the cutting tool 4 in its cutting motion after the infeed step, the operator turns the seal-up housing 2 through one turn around the existing pipe 1 in the circumferential direction R thereof. More specifically, the cutting tool 4 makes a feed motion turning together with the seal-up housing 2 in the circumferential direction R while simultaneously turning around the cutter shaft 32. In this manner, the operator turns the cutting tool 4 through the entire circumference of the existing pipe 1 with the cutting tool 4 in its feed motion. The existing pipe 1 is thus cut through the entire perimeter in the circumferential direction R without producing any cut-off sections so that a cutoff groove 12C is formed in the existing pipe 1, the cutoff groove 12C extending over the entire perimeter in the circumferential direction R as shown in FIG. 2(*b*). That is, the existing pipe 1 is divided in the pipe axial direction.

Tool Removal Step

The cutting tool 4 is removed by use of a method which will be described below.

After the storage of the cutting tool 4 in the cutter case 31A, the operator closes the operation valve 70 as shown in FIG. 2(*b*). The operator thereafter removes the cutter 3.

Blocking Step

Figures 5A, 5B:
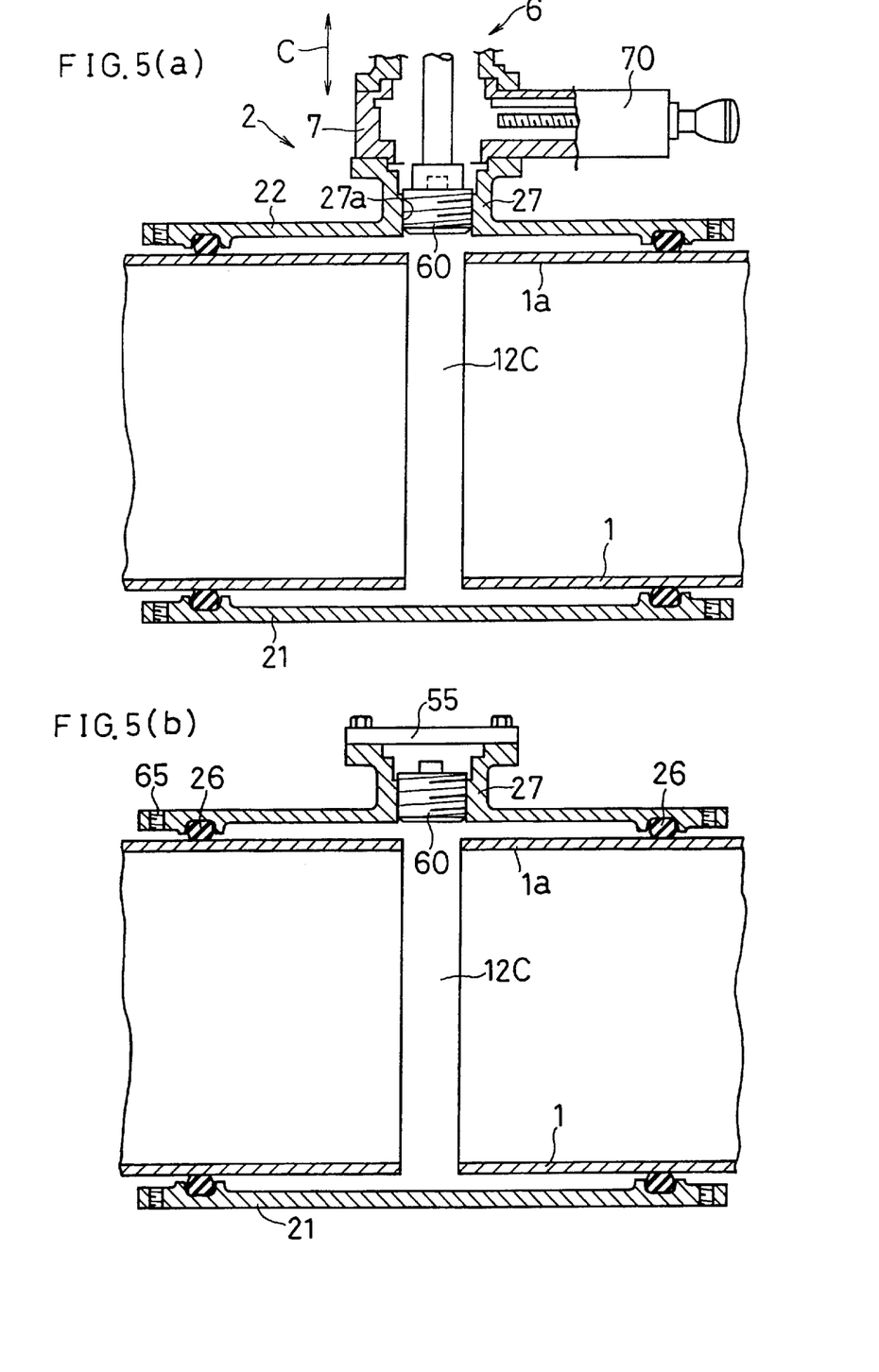
FIG. 5(a) is a longitudinal sectional view showing a blocking step.
FIG. 5(b) is a longitudinal sectional view showing a piping structure.

After the tool removal step, the operator attaches a known plug inserter 6 shown in FIG. 5(*a*) to the operation valve 70 to open the operation valve 70. After this valve opening, the operator acts on the plug inserter 6 to screw the plug 60 into the internally threaded portion 27*a* of the branching portion 27 as shown in FIG. 5(*a*) to thereby block the cutting tool insertion aperture 28.

Valve Dismounting Step

After the blocking step, the operator dismounts the plug and then dismounts the operation valve 70 together with the valve casing 7. The operator thereafter mounts a flange cover 55 of FIG. 5(*b*) onto the branching portion 27. Thus, the operation is completed to obtain a piping structure of FIG. 5(*b*).

After the completion of the blocking step, the seal-up housing 2 may firmly be secured to the existing pipe 1 by screwing a set screw called a "push bolt" into the internally threaded portion 65 formed in the seal-up housing 2.

Description will then be made of an example of a fluid supply interruption free method of the present invention.

Figure 6A:
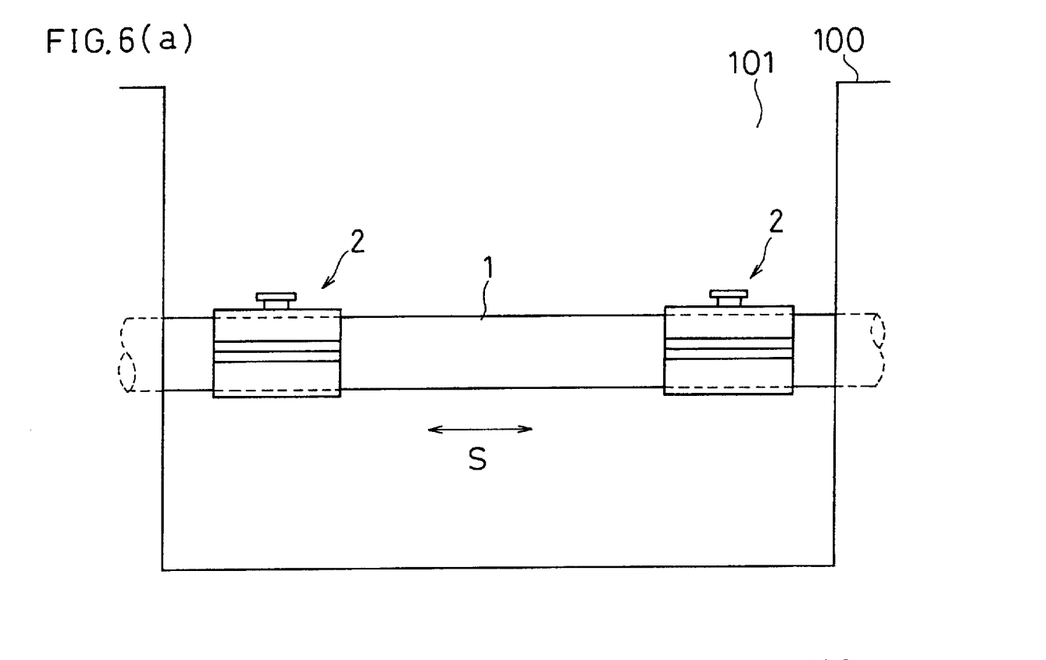
FIGS. 6(a) and 6(b) are schematic side elevational views each showing an embodiment of this method of construction.

First, as shown in FIG. 6(a), a pit 101 is formed in the ground 100 to allow the existing pipe 1 to be exposed. Within the pit 101, a pair of seal-up housings 2 are mounted on the existing pipe 1 at spaced apart locations in the pipe axial direction S of the existing pipe 1. Typically, the pitch (distance) to dispose the two seal-up housings 2 is preferably set to 10 meters or less, and more preferably to 6 meters or less.

Figure 6B:
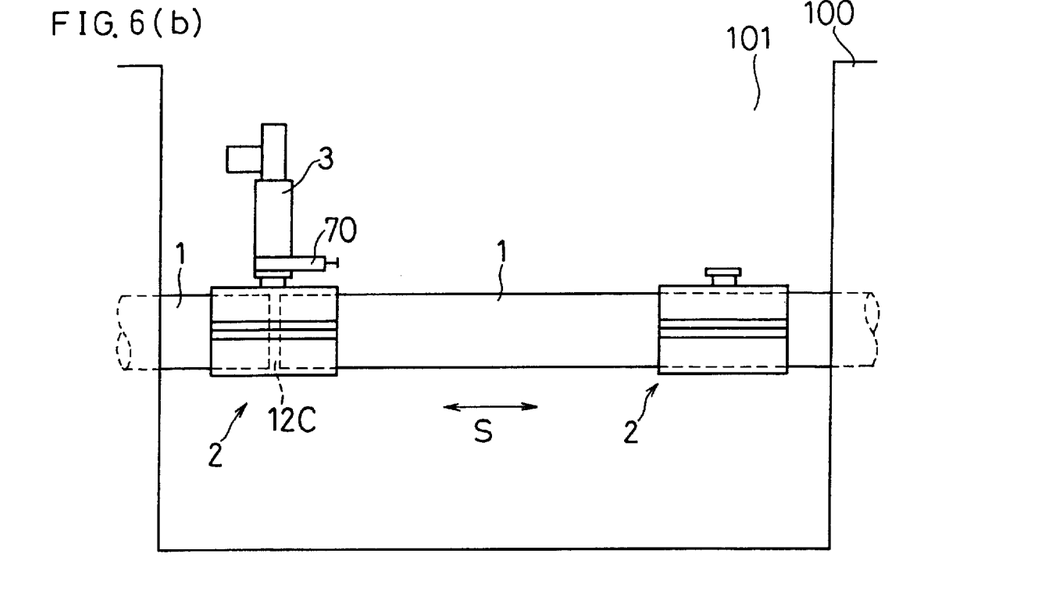

Subsequently, as shown in FIG. 6(b), the operation valve 70 and the cutter 3 are mounted on one seal-up housing 2 so that the one seal-up housing 2 is subjected to the infeed step, the feed step, the tool removal step, the blocking step and the valve dismounting step. Thus, as shown in FIG. 7(a), a cutoff groove 12C is formed in the one seal-up housing 2.

Figure 7A:
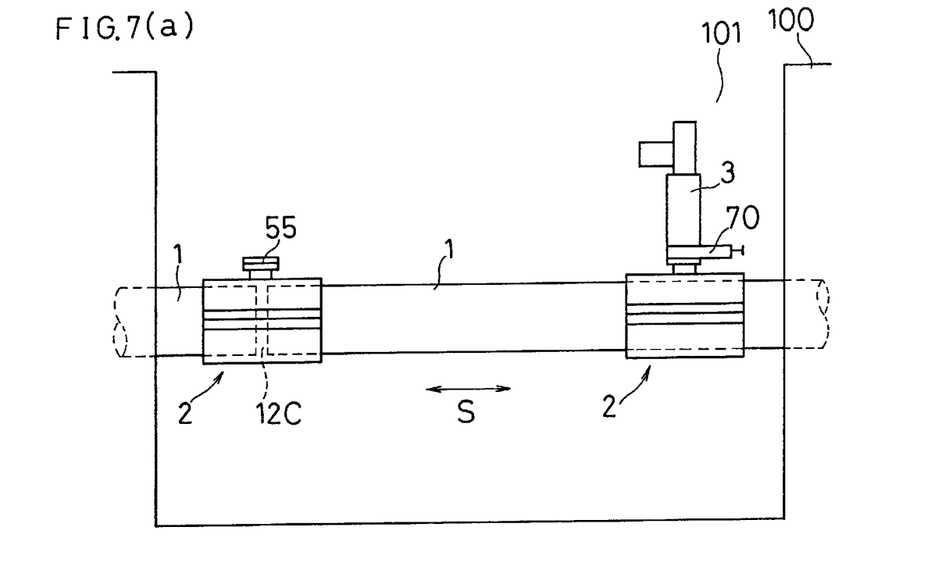
FIGS. 7(a) and 7(b) are schematic side elevational views each showing the embodiment of this method of construction.
Figure 7B:
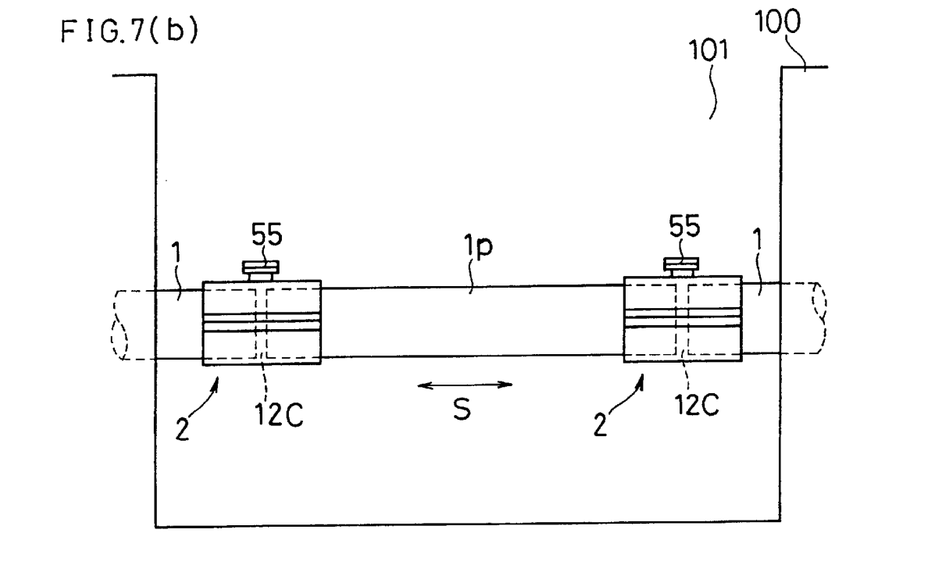

Afterward, as shown in FIG. 7(a), the operation valve 70 and the cutter 3 are mounted on the other seal-up housing so that the other seal housing 2 is subjected to the infeed step, the feed step, the tool removal step, the blocking step and the valve dismounting step. Thus, as shown in FIG. 7(b), another cutoff groove 12C is formed in the other seal-up housing 2.

In this manner, the two cutoff grooves 12C are formed in a single existing pipe 1 at the spaced apart locations in the pipe axial direction S so as to leave a straight pipe portion 1p between the two cutoff grooves 12C without removal from the existing pipeline. The pit 101 is then buried to complete the construction work.

The thus formed piping structure has a flexibility and contraction and expansion properties due to the presence of the two cutoff grooves 12C.

In particular, the detachment of the operation valve in the valve dismounting step allows a smaller portion to protrude radially from the existing pipe. The seal-up housings are therefore displaceable in the pipe axial direction in the earth, enabling the pipeline to easily deform and follow irrespective of occurrence of earthquake or uneven settlement of the ground.

Variant

Figure 8A:
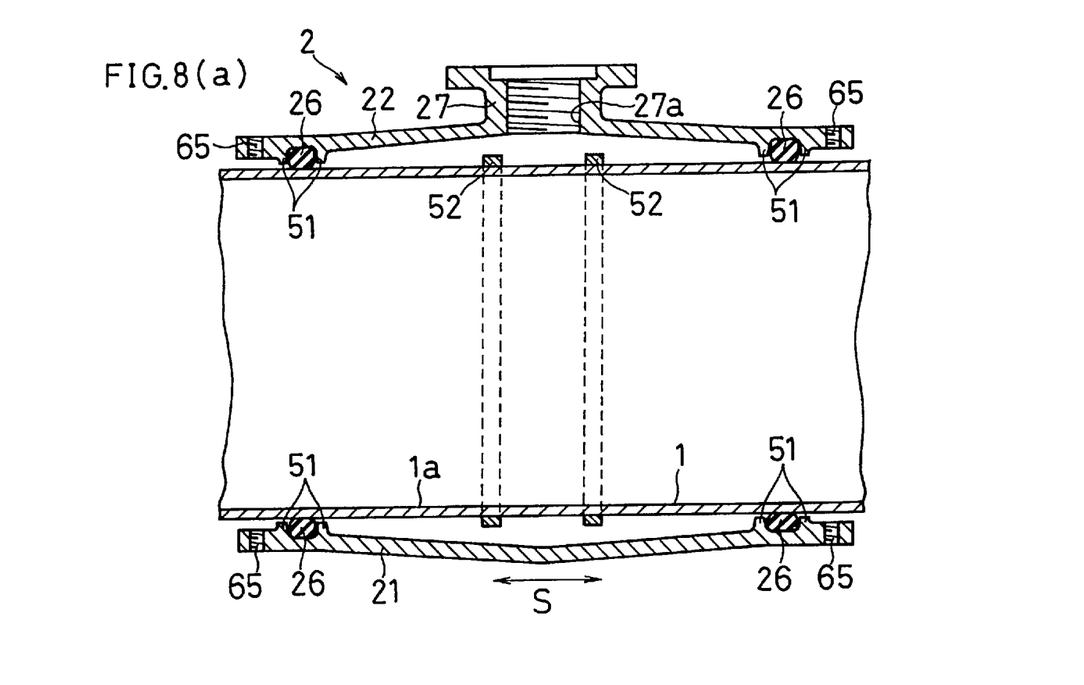
FIG. 8(a) is a longitudinal sectional view showing an assembly step of a variant.
Figure 8B:
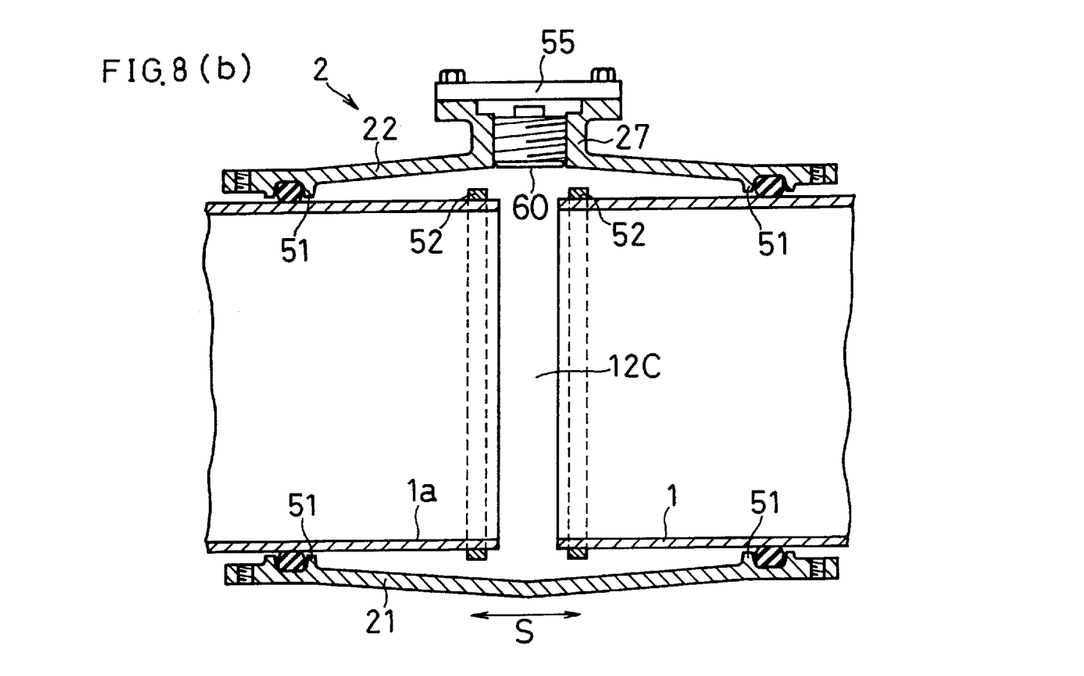
FIG. 8(b) is a longitudinal sectional view showing a piping structure of the variant.

FIGS. 8(a) and 8(b) depict another example of the seal-up housing 2.

Like a typical coupling collar, this seal-up housing 2 has an inner diameter that gradually increases accordingly as it comes closer to the central portion in the pipe axial direction S. As used herein, the "inner diameter gradually increases" means that the inner peripheral surface of the seal-up housing 2 gradually goes apart from the outer peripheral surface of the existing pipe 1. This permits a larger deflection angle of the existing pipe 1 after the cutoff of the existing pie 1 shown in FIG. 8(b).

In this variant, previous to the assembly step, a pair of second ridges 52, 52 are welded to or screwed into the outer periphery of the existing pipe 1 as depicted in FIG. 8(a). The second ridges 52, 52 slightly protrude outward in the pipe radial direction on the outer peripheral surface of the existing pipe 1 to allow a proximity to the inner peripheral surface of the seal-up housing 2. After the weld or screwing, execution is made of the assembly step, the infeed step, the feed step, the tool removal step, the blocking step and the valve dismounting step to thereby form a cutoff groove 12C between the pair of second ridges 52, 52 as depicted in FIG. 8(b). When the right and left existing pipes 1 attempt to escape from the seal-up housing 2 in the pipe axial direction S, the second ridges 52, 52 comes into engagement with the first ridges 51, 51 to thereby prevent the existing pipes 1 from being disengaged from the seal-up housing 2. Thus, the second ridges 52, 52 can be displaced up to locations where they engage with the first ridges 51, 51, so that the permissible extension of the existing line becomes about twice that of the first embodiment.

Although the above variant has employed a pair of ring-like second ridges 52, 52, each ridge may be separated into two or more parts in the circumferential direction of the existing pipe 1. Alternatively, the circumferentially separated second ridges 52, 52 may be provided in a spaced-apart relationship. Furthermore, the second ridges 52, 52 can be of any other form than depicted in FIG. 8 as long as they can engage with the first ridges 51, 51.

Although the preferred embodiments have hereinabove been described with reference to the drawings, it will be easy for those skilled in the art to conceive various changes and modifications from this specification without departing from the obvious scope and sprit of the present invention.

By way of example, the cutter may be a known drill. The cutter may be mounted on the seal-up housing, previous to the enclosure of the existing pipe by the seal-up housing.

The seal-up housing may circumferentially be separated into three or four parts.

Three or more sets of seal-up housings may be mounted.

Any other fluid than water such as oil or gas flowing through the interior of the existing pipe in the present invention can be within the scope of the present invention.

It is therefore to be construed that such changes and modifications lie within the scope of the present invention.

What is claimed is:

1. A fluid supply interruption free method of construction in which a pit is formed in the earth so as to allow an exposure of an existing straight pipe and a construction work is performed with a fluid flowing through the straight pipe, the method comprising the steps of:

providing a cutter having a milling-like cutting tool, and providing two sets of seal-up housings each comprising a plurality of circumferentially segmented housing parts;

the milling-like cutting tool being mounted on the cutter in such a manner as to be rotatable around an axis that is positioned in the radial direction of the existing straight pipe, the two sets of seal-up housings each hermetically enclosing a part of the existing straight pipe and having a structure suited for rotations around the straight pipe in the circumferential direction of the straight pipe, each seal-up housing having a cutting tool insertion aperture adapted for insertion of the cutting tool into the straight pipe in the radial direction of the straight pipe, the cutting tool insertion aperture having a smaller diameter than a pipe inner diameter of the straight pipe, the method further comprising:

an assembly step including mounting said seal-up housing on the existing straight pipe to enclose a part of the straight pipe by the seal-up housing, and mounting the cutter on the cutting tool insertion aperture of the seal-up housing, an infeed step including causing the cutting tool to cut into the straight pipe in the radial direction of the straight pipe while turning the cutting tool around the axis to make a cutting motion for cutting the straight pipe by turns of the cutting tool, a feed step including rotating the seal-up housing in the circumferential direction of the straight pipe while continuing the cutting motion, the rotations causing the cutting tool to rotate in the circumferential direction of the straight pipe to make a feed motion of the cutting tool, to thereby form a cutoff groove in the straight pipe over the entire perimeter of the straight pipe, a tool removal step including removing the cutting tool from the seal-up housing after the formation of the cutoff groove, for each of the two sets of seal-up housings, executing the assembly step, the infeed step, the feed step and the tool removal step;

each of the two sets of seal-up housings having an internal thread formed in an inner peripheral surface of a branching portion that defines the cutting tool insertion aperture;

providing in advance a pair of plugs each having an external thread that screws into the internal thread; and a blocking step for screwing the plug into each of the cutting tool insertion apertures of the two sets of seal-up housings to thereby block the insertion apertures, wherein the two sets of seal-up housings are mounted on the existing straight pipe at two axially spaced-apart locations within a single pit in the assembly step, to thereby form two axially spaced-apart cutoff grooves in the straight pipe in the feed step, and are left a straight pipe portion between the two cutoff grooves without extraction from an existing pipe line to thereby impart a flexibility and contraction and expansion properties to the pipeline.

2. The fluid supply interruption free method of construction according to claim 1, wherein the seal-up housing has no valve passage aperture adapted for insertion of a valve into the straight pipe and has a larger diameter than the inner diameter of the straight pipe.

3. The fluid supply interruption free method of construction according to claim 1, further comprising:

an operation valve being removably mounted on the tip of the branching portion of the seal-up housing, the operation valve allowing a removal of the cutting tool and an insertion of the plug with the fluid flowing through the straight pipe; and a valve dismounting step for dismounting the operation valve after the blocking step.

4. A fluid supply interruption free method of construction in which a pit is formed in the earth so as to allow an exposure of an existing straight pipe and a construction work is performed with a fluid flowing through the straight pipe, the method comprising the steps of:

providing a cutter having a milling-like cutting tool, and providing two sets of seal-up housings each comprising a plurality of circumferentially segmented housing parts;

the milling-like cutting tool being mounted on the cutter in such a manner as to be rotatable around an axis that is positioned in the radial direction of the existing straight pipe, the two sets of seal-up housings each hermetically enclosing a part of the existing straight pipe and having a structure suited for rotations around the straight pipe in the circumferential direction of the straight pipe, each seal-up housing having a cutting tool insertion aperture adapted for insertion of the cutting tool into the straight pipe in the radial direction of the straight pipe, the cutting tool insertion aperture having a smaller diameter than a pipe inner diameter of the straight pipe, the method further comprising:

an assembly step including mounting said seal-up housing on the existing straight pipe to enclose a part of the straight pipe by the seal-up housing, and mounting the cutter on the cutting tool insertion aperture of the seal-up housing, an infeed step including causing the cutting tool to cut into the straight pipe in the radial direction of the straight pipe while turning the cutting tool around the axis to make a cutting motion for cutting the straight pipe by turns of the cutting tool, a feed step including rotating the seal-up housing in the circumferential direction of the straight pipe while continuing the cutting motion, the rotations causing the cutting tool to rotate in the circumferential direction of the straight pipe to make a feed motion of the cutting tool, to thereby form a cutoff groove in the straight pipe over the entire perimeter of the straight pipe, a tool removal step including removing the cutting tool from the seal-up housing after the formation of the cutoff groove, for each of the two sets of seal-up housings, executing the assembly step, the infeed step, the feed step and the tool removal step;

each of the two sets of seal-up housings having on its inner surface a pair of first ridges that protrude inward of the seal-up housing to thereby be near an outer peripheral surface of the straight pipe;

fastening a pair of second ridges to the outer periphery of the straight pipe mounted with the two sets of seal-up housings, respectively, previous to mounting of each seal-up housing on the straight pipe; and the cut-off groove being formed between the pair of second ridges fastened, whereby in case the straight pipe is displaced in the direction where it disengages from the seal-up housings, the first ridges and the second ridges engage with each other in the pipe axial direction to thereby prevent the straight pipe from being disengaged from the seal-up housing, wherein the two sets of seal-up housings are mounted on the existing straight pipe at two axially spaced-apart locations within a single pit in the assembly step, to thereby form two axially spaced-apart cutoff grooves in the straight pipe in the feed step, and are left a straight pipe portion between the two cutoff grooves without extraction from an existing pipe line to thereby impart a flexibility and contraction and expansion properties to the pipeline.

5. The fluid supply interruption free method of construction according to claim 4, wherein the cutting tool insertion aperture is disposed substantially at a center in the pipe axial direction of the straight pipe in each of the two sets of seal-up housings, and wherein the seal-up housing has a larger inner diameter accordingly as it comes closer to the center.

* * * * *